Figure 1:
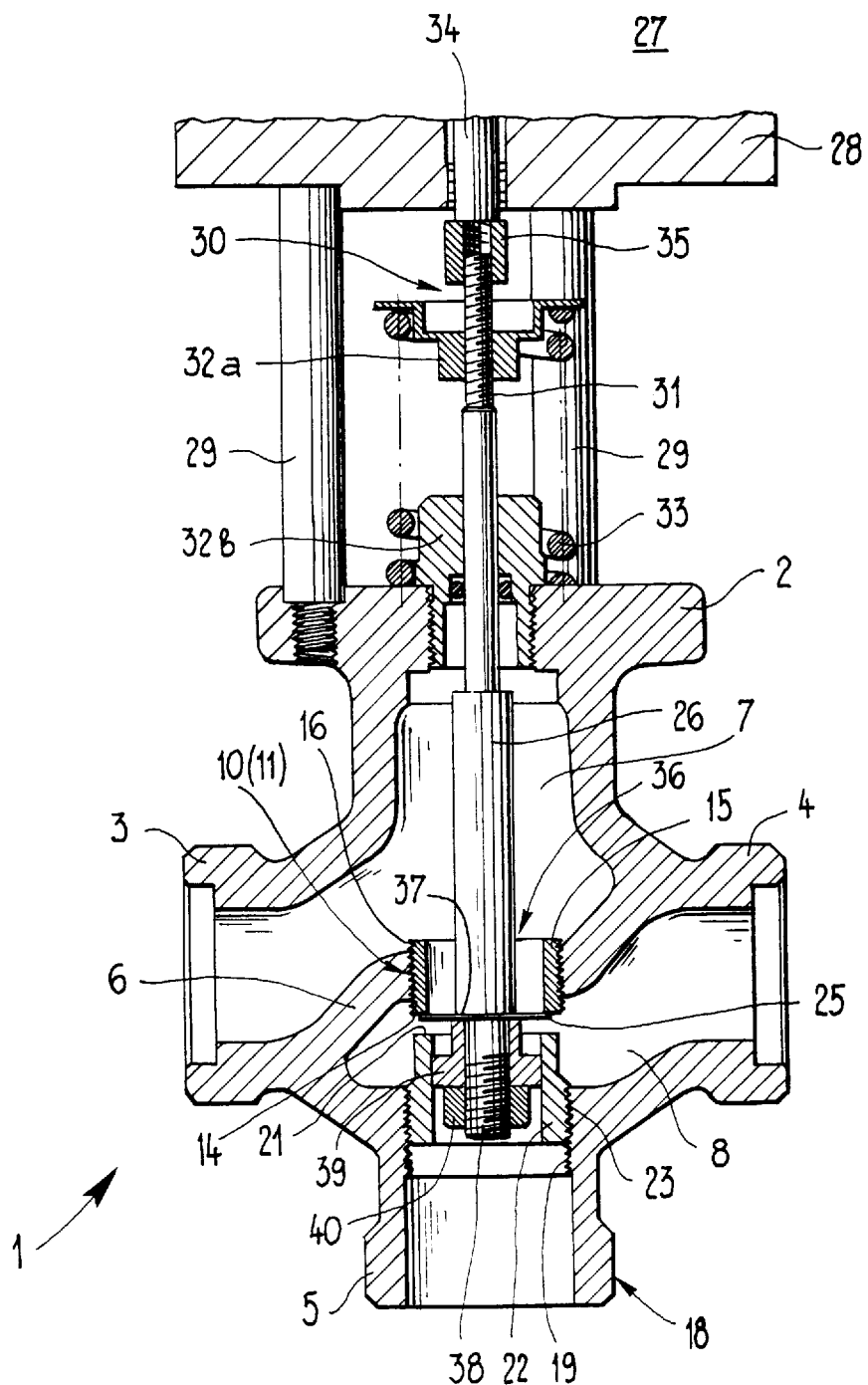

United States Patent
Brühlmann et al.

[11] Patent Number: 5,832,957
[45] Date of Patent: Nov. 10, 1998

[54] VALVE HAVING AT LEAST ONE ANNULAR VALVE SEAT ELEMENT

[75] Inventors: Manuel Brühlmann, Zürich; Max Zumbühl, Hombrechtikon; Hans Bucher, Schübelbach, all of Switzerland

[73] Assignee: Staefa Control System SCS AG, Stafa, Switzerland

[21] Appl. No.: 737,706

[22] PCT Filed: Feb. 29, 1996

[86] PCT No.: PCT/CH96/00068

§ 371 Date: Nov. 5, 1996

§ 102(e) Date: Nov. 5, 1996

[87] PCT Pub. No.: WO96/28674

PCT Pub. Date: Sep. 19, 1996

[30] Foreign Application Priority Data

Mar. 13, 1995 [CH] Switzerland ............ 00715/95

[51] Int. Cl.⁶ .................................................. F16K 11/44
[52] U.S. Cl. .................................. 137/625.5; 251/86
[58] Field of Search ................ 137/625.5; 251/86

[56] References Cited

U.S. PATENT DOCUMENTS

| | | |
|---|---|---|
| 1,525,100 | 2/1925 | Lichtenberg . |
| 2,812,776 | 11/1957 | Lofftus ............ 137/625.5 X |
| 3,185,172 | 5/1965 | Hajek ............ 137/625.5 X |
| 4,114,850 | 9/1978 | Alamprese ............ 251/86 |
| 5,246,205 | 9/1993 | Gillingham et al. ........ 251/86 X |

FOREIGN PATENT DOCUMENTS

| | | | |
|---|---|---|---|
| 2 151 367 | 3/1973 | France ............ F16K 11/00 |
| 2 268 206 | 11/1975 | France ............ F16K 1/32 |
| 31 47 063 A1 | 6/1983 | Germany ............ F16K 1/42 |
| 544524 | 4/1942 | United Kingdom . | |

*Primary Examiner*—John Fox
*Attorney, Agent, or Firm*—Adams Law Firm, P.A.

[57] ABSTRACT

A valve is described, with at least one annular valve seat element (15; 22), with a spindle (26) and with a closing part (25) which is connected to the latter and the center point of which lies in the axis of the spindle (26). The closing part (25) can be brought onto the valve seat (14; 21) as a result of the axial displacement of the spindle (26). The closing part (25) and the valve seat element (15; 22) can, in the preassembled state, be adjusted relative to one another into a fitted closed position in the manner of a ball movement and/or of a radial and axial movement and, in the ready-assembled state, are fixed in this fitted closed position.

8 Claims, 4 Drawing Sheets

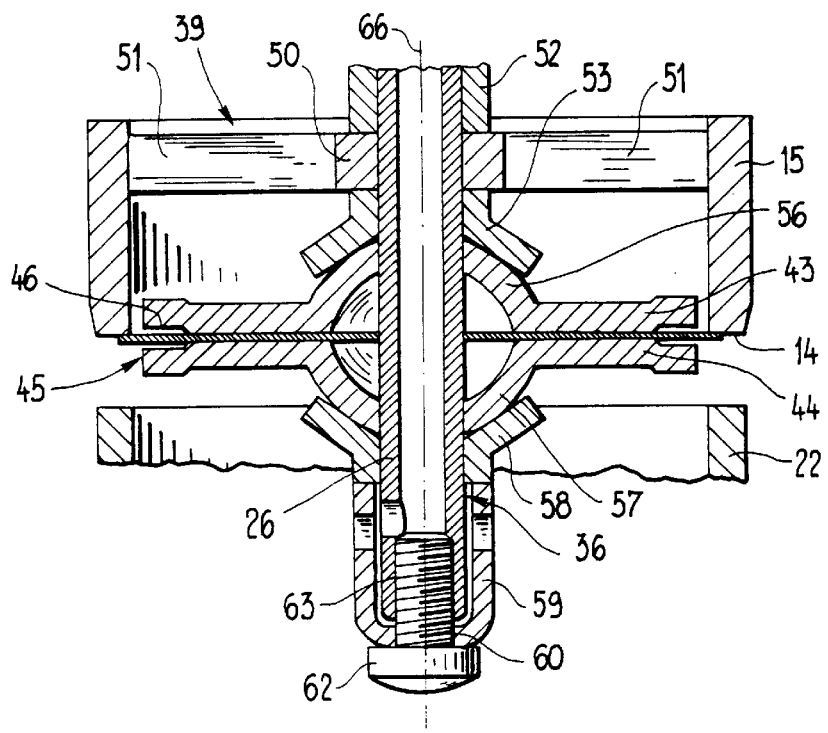
Fig. 2
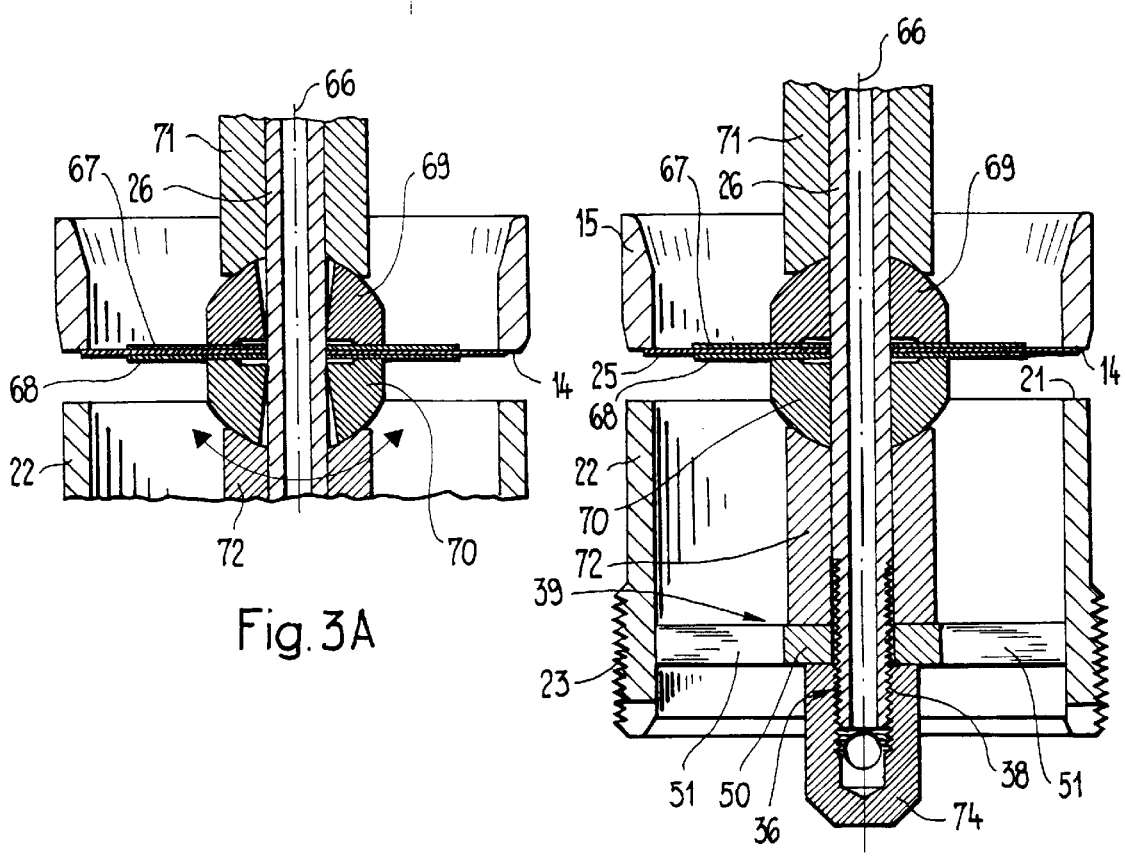
Fig. 3A
Fig. 3

VALVE HAVING AT LEAST ONE ANNULAR VALVE SEAT ELEMENT

This application is a national stage application, according to Chapter I of the Patent Cooperation Treaty.

Invention relates to a valve having at least one annular valve seat element according to the preamble of patent claim 1.

Such a valve is known, for example, from CH-A-536, 957. The valve described has an annular valve seat, onto which a closing part can be brought to bear. The closing part is connected to a spindle which is mounted axially displacably. The sheet-like closing part is arched elastically and spherically in the closed position of the valve and rests with its edge region directly on the valve seat. The closing part consists of two disks which are clamped by means of a nut, with two washers interposed, on that end of the spindle which is the inner end in relation to the valve housing. In this design, said closing part behaves in the same way as a self-supporting diaphragm which is firmly clamped at its center and which, when supported only along its circumference on the valve seat, can arch elastically and spherically. In order to prevent the limit of elasticity of the two disks forming the closing part from being exceeded, a stop disk can additionally be arranged at a distance on the side of the disks which faces away from the spindle end.

In order to compensate errors of alignment between the spindle axis and the axis of the valve seat when the above valve is in the closed position, the spindle can, in its region adjacent to the closing part, be designed so as to be capable of bending elastically. In order to compensate slight manufacturing inaccuracies in the production of the individual elements of the valve, such as during the screwing-in of the valve seat ring, in the suspension of the movably displacable spindle, during the cutting of the internal thread into the partition between the two flow chambers in the valve housing and the like, the closing part has to be pressed onto the valve seat with a closing force additional to the sealing force, in order to overcome the inclination of the closing part. Furthermore, a generous overlap between the closing part and the annular valve seat is unavoidable, in order to prevent manufacturing inaccuracies in the overlap consequently leaky points in the closed position. So as to achieve a higher effective accuracy of the closed position, higher closing forces are therefore required, thus necessitating a larger dimensioning of the electromagnetic drive, and an exact dimensioning of the tolerances to preserve the overlap area is required.

The object on which the present invention is based is to improve a valve of the generic type, in such a way that a reduction in the closing forces at minimal additional outlay, using the conventional manufacturing technique, and a more accurate overlap of the closing part, without additional tolerances in respect of the valve seat, can be obtained.

This object is achieved, according to the invention, by means of a valve having the features of patent claim 1.

The great advantage of the invention is that, along with the usual quality requirements during production, higher accuracy of the closed position of a valve can be achieved and, nevertheless, there is no longer any need for further operating equipment. The closing forces required, which act on the closing part, are substantially lower, so that the valve can be operated by means of electromagnetic drives having smaller dimensions. The construction dimensions of the valve housing can also be adhered to without difficulty for the valve according to the invention, so that no changes in the existing assembly cycle have to be made and the practical use of a valve according to the invention is not influenced. Advantageously, the closing part is adjusted into the fitted closed position under the counterforce of a spring element necessary for the drive. This spring element makes nonpositive connection from the top side of the valve housing via the spindle to the closing part, so that inaccuracies of fit are compensated automatically by assembly.

Further particulars and advantages of the invention emerge from the dependent claims and from the following description, in which various embodiments of the valve according to the invention are described in more detail, purely by way of example, with reference to the diagrammatic drawings.

In these:

FIG. 1 shows a three-way valve having two valve seats, partly in longitudinal section and partly in elevation, FIG. 2 shows, in cross section, a first alternative for fastening the closing part to the spindle, with a closing-part stop and with radial and tilting movability of the closing part, FIG. 3 shows, in cross section, a second alternative for fastening the closing part to the spindle, with inner centering of the closing part via the spindle and centering of the valve seat element via a guide element guided by the spindle, and only with tilting movability of the closing part, FIG. 3A shows a fragmentary, enlarged view of the second alternative for fastening the closing part to the spindle.

Figure 4:
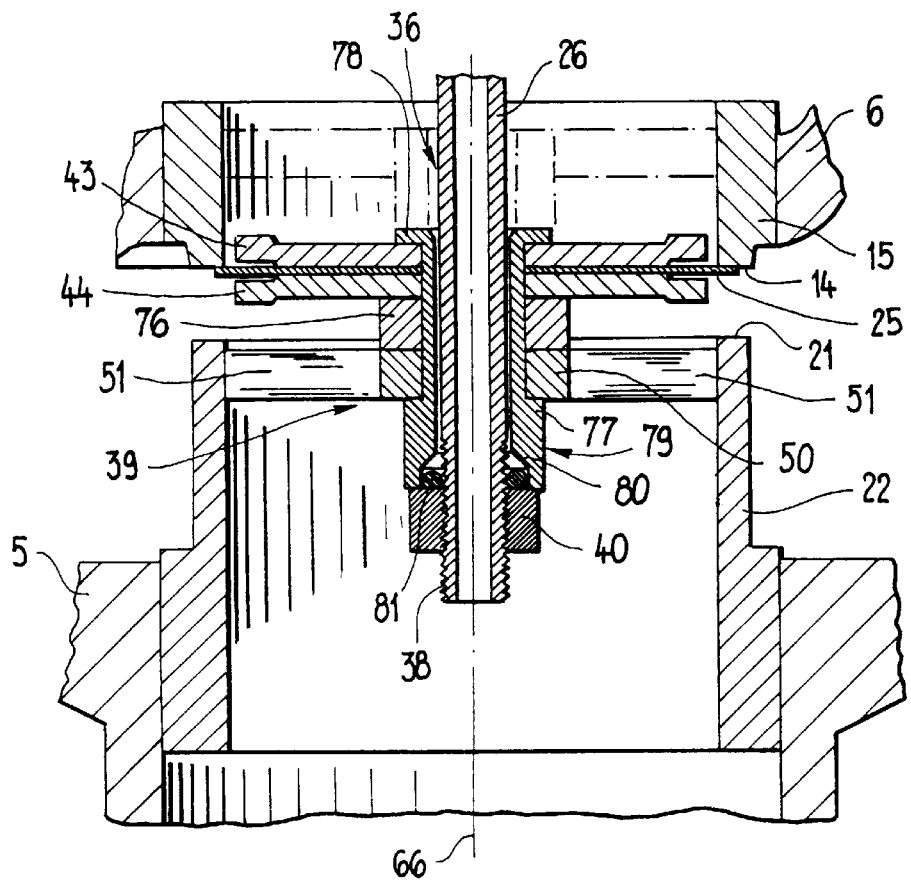
Figure 5:
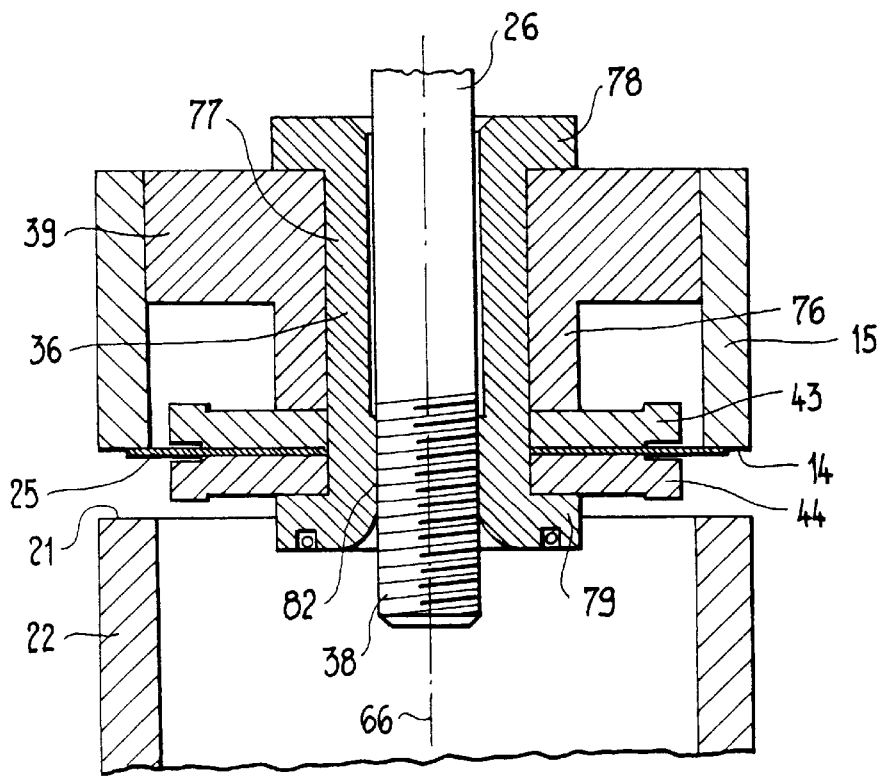
Figure 6:
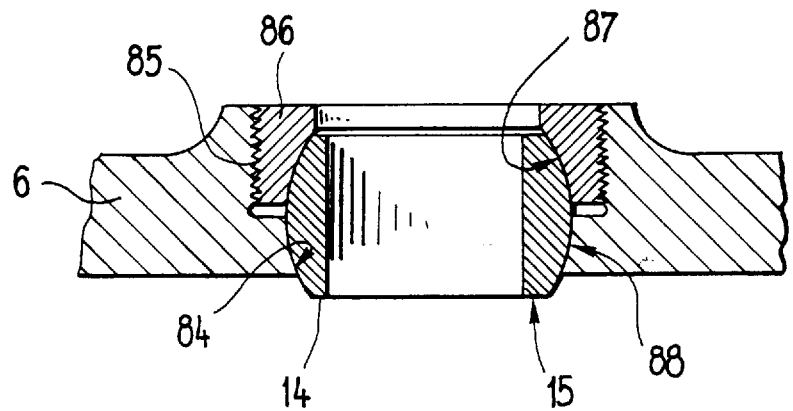
Figure 7:
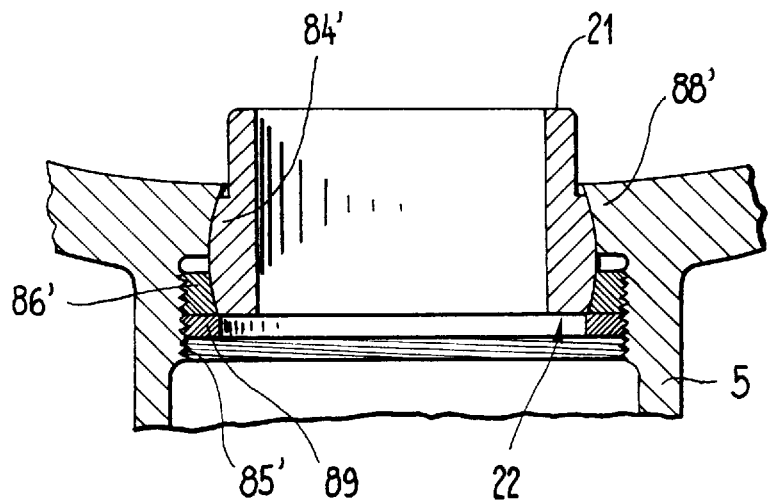

FIG. 4 shows, in cross section, a third alternative for fastening the closing part to the spindle, with a closing-part stop and outer centering of the closing part by means of a guide element guided on the second valve seat element, and with radial, axial and tilting movability of the closing part, FIG. 5 shows, in cross section, a fourth alternative for fastening the closing part to the spindle, with a closing-part stop and outer centering of the closing part by means of a guide element guided on the first valve seat element, and with radial, axial and tilting movability of the closing part, FIG. 6 shows the rotational adjustability of the first valve seat as a detail, and FIG. 7 shows the rotational adjustability of the second valve seat as a detail.

In the Figures, the same reference symbols have been used in each case for the same elements, so that a first explanation of a specific element also applies to the other Figures, unless specified otherwise.

FIG. 1 shows a three-way valve 1 with a valve housing 2. The housing 2 has three connection pieces 3, 4 and 5, of which the connection pieces 3 and 4 are located diametrically opposite one another and the connection piece 5 is arranged, with its axis at right angles to the axes of the connection pieces 3 and 4, at the bottom in the valve housing 2. The valve housing 2 is divided by means of a partition 6 into two chambers 7 and 8, in which the connection pieces 3 and 4 open out. Provided in the partition 6 is a central bore 10 having an internal thread 11, into which a first valve seat element 15 having an annular valve seat 14 is screwed or pressed by means of an external thread 16. The inner end region 18 of the connection piece 5 is provided with an internal thread 19, into which a second valve seat element 22 having an annular valve seat 21 is screwed or pressed by means of its external thread 23. A closing part 25 designed as a thin circular disk is fastened on a rod-shaped spindle 26 and can be moved up and down in the axial direction between the two valve seat elements 15 and 22 into a respective closed position. The axes of the valve seat elements 15 and 22 are coaxial relative to the spindle 26.

An electromagnetic drive 27, not shown here, is fastened, in a housing 28, to the valve housing 2 by means of three pillars 29 screwed into the valve housing 2 (only two can be seen in the Figure). In the upper end region 30, the spindle 26 is provided with an external thread 31, on which a union nut 32a is screwed. A helical spring 33 serving as a spring element acting on the closing part 25 is prestressed between the union nut 32a and a spindle bushing 32b screwed or pressed into the valve housing 2. The armature spindle 34 of the electro-magnetic drive 27, said armature spindle being shown only partially, is in pressing abutment against a tubular piece 35 screwed onto the spindle 26.

Furthermore, the lower end region 36 of the spindle 26 has an annular step 37 and an external thread 38. The closing part 25 bears on the annular step 37 and is fastened to the spindle 26 by means of a guide element 39, guided on the inner wall of the second valve seat element 22, and a nut 46 screwed onto the external thread 38. A nonpositive connection via the valve housing 2, the helical spring 33 and the closing part 25 fastened to the spindle 26 is thereby guaranteed. The spindle 26 is thus mounted at the top on the spindle bushing 32b and at the bottom on the guide element 39.

FIG. 2 shows a first alternative for fastening the closing part 25 to the spindle 26 in the region of the two valve seat elements 15 and 22. The closing part 25 is clamped on both sides by an upper support plate 43 and a lower support plate 44. The thickness of these support plates 43 and 44 is substantially greater, approximately ten times greater, than that of the thin closing part 25. The edge region 45 of each of the support plates 43 and 44 is provided with an annular recess 46 which is radially open on the side facing the closing part 25. The support plates 43 and 44 can also be designed so as to be star-shaped, in which case the star points are to be arranged in a manner offset relative to one another, that is to say noncongruently, as seen in the axial direction. Consequently, in the closed position, the closing part 25 can be arched elastically and spherically, at most in its edge region to only a restricted extent.

The spindle 26 is designed hollow-cylindrically here, but can also be solid. The guide element 39 is formed by a wide ring 50 having radial spacers 51 which are distributed uniformly over its circumference and which are guided on the inner wall of the first valve seat element 15. The ring 50 is clamped on the spindle 26 between an upper intermediate tube 52 and an upper cap-like holding ring 53 provided with an outward-turned edge. The upper intermediate tube 52 is supported toward the top, for example, against the spindle bushing 32b (see FIG. 1). The holding ring 53 rests on a dome-like arch 56 of the upper support plate 43. The lower support plate 44 is likewise provided with a dome-like arch 57, against which a lower cap-like holding ring 58 presses, the design of said holding ring being identical to that of the upper holding ring 53. A lower intermediate tube 59 designed as a cylindrical cover is formed with a bore 60 for receiving a screw 62 which is screwed into an axial internal thread 63 in the lower free end region 36 of the spindle 26. Static friction is exerted on the valve seat 14 by the closing part 25 as a result of the prestress of the spring element 33, so that the torque exerted by screwing tight onto the spindle 26 is counteracted.

The inside hole diameter of the two support plates 43 and 44 and that of the closing part 25 have sufficient play relative to the outside diameter of the spindle 26, so that the closing part 25 contained by the support plates 43 and 44 can execute a tilting movement in a limited angular range in relation to the axis 66 of the spindle 26 by virtue of nonpositive connection. The closing part 25 thus adjusts itself automatically into the exact fitted closed position onto the upper valve seat 14 of the valve seat element 15 on account of the closing force exerted on the closing part 25 by the helical spring 33. It is presumed, in this case, that the screw 62 is not yet finally tightened, that is to say the valve 1 is still in the preassembled state. Since the second valve seat 22 was already aligned with the first valve seat 15 during assembly, that is to say the valve seats 14 and 21 are exactly in parallel planes, there is no longer any need for further adjustment of the closing part 25 in relation to the second valve seat 21. When this adjustment has taken place, the screw 62 is finally tightened by means of a predetermined torque and is fixed in this position.

FIG. 3 and FIG. 3A show a second alternative for the rotationally adjustable fastening of the closing part 25 to the spindle 26. Here, the closing part 25, surrounded by approximately equally thin and flat support plates 67 and 68 of relatively small diameter, is clamped between two hemispheres 69 and 70. These hemispheres 69 and 70 are held with a clamping effect on the spindle 26 by an upper intermediate tube 71 and a lower intermediate tube 72. The intermediate tubes 71 and 72 are provided with spherical recesses in conformity with the hemispheres 69 and 70. In this case, the ring 50 having the spacers 51 is provided underneath the lower intermediate tube 72 as a guide element 39, for guidance on the inner wall of the second valve seat element 22. The entire arrangement is supported against the spindle bushing 32b (see FIG. 1) by means of a cap nut 74 screwed on the external thread 38 on the free end region 36 of the spindle 26.

In this alternative, due to the support of the hemispheres 69 and 70 on the spindle 26, the closing part 25 is mounted so as to be tiltable relative to the axis 66 within a limited angular range. For this purpose, the central bore of a hemisphere 69 and 70 can be designed slightly conically from the outside inward, so that a kind of "fulcrum" occurs on the spindle 26 in the region of the closing part 25. This "fulcrum" is formed, in fact, by an annular region around the spindle 26, so that the hemispheres 69 and 70 can roll together on the spindle 26 within a greatly restricted range of angle of rotation. The spindle 26 itself is guided on the inner wall of the second valve seat element 22 by the guide element 39 consisting of the ring 50 and of the spacers 51. Due to the play of the valve seat element 22 screwed in the external thread 23, said valve seat element is axially movable in the preassembled state and is centered relative to the spindle 26 by the guide element 39. The valve seat element 22 is then fixed in this set fitted closed position, for example by soldering or adhesive bonding by means of a suitable quick-drying adhesive (for example, "Loctite"). It goes without saying that this guide can also be provided for the first valve seat element 15 only, for which purpose the guide element 39 is then arranged on the spindle 26 above the closing part 25.

If the inherent rigidity and alignment of the spindle 26 are sufficient in its free end region 36, such guidance by means of the guide element 39 can even be dispensed with.

FIG. 4 shows a third alternative for the rotationally adjustable fastening of the closing part 25 to the spindle 26 of the valve 1. Here, the closing part 25 is held between two flat support plates 43 and 44, in a similar way to the design of FIG. 2, but without dome-like arches. The support plates 43 and 44 and the closing part 25 are pressed, together with an intermediate ring 76 and the ring 50 of the guide element 39, on a sleeve 77 having end-face flanges 78 and 79. This sleeve 77 has an inside diameter which is greater than the outside diameter of the spindle 26, so that a tilting movement of the sleeves 77 on the spindle 26 within a restricted angular range and an axial and/or radial displacement of the sleeve 77 as far as coaxial alignment are possible. In this case, the sleeve 77 is secured toward the bottom on the spindle 26 by means of the nut 40 screwed on the external thread 38. However, upward displacement along the spindle 26 is still allowed. In the fitted closed position therefore, the closing part 25 adjusts itself onto the valve seat 14 of the first valve seat element 15 in such a way that the closing forces exerted thereon are distributed uniformly over the edge region of the closing part 25, that is to say an automatic setting of the correct position of the closing part 25 takes place. When the correct magnitude of the closing force in this fitted closed position has been determined, the sleeve 77 is fixed on the spindle 26 by soldering. For this purpose, an annular groove 80 is provided in the end face of the lower flange 79, there being inserted into said annular groove a soldering ring 81 which is heated to the necessary soldering temperature by an electric induction ring (not shown), in order to solder the sleeve 77 to the spindle 26.

In this third alternative, the closing part 25 is guided on the inner wall of the second valve seat element 22 via the sleeve 77 by means of the guide element 39 and is thus centered on the valve seat 14. The spindle 26 therefore has, here, only the function of bringing the closing part 25 into the closed position, and the exact fit is accomplished by the guided sleeve 77.

A fourth alternative, which is similar to the third alternative, is shown in FIG. 5. The fastening of the closing part 25 to the two support plates 43 and 44 is similar to that of the preceding alternative, the intermediate ring 76 shown there being integrated in the guide element 39 guided on the inner wall of the first valve seat element 15. The sleeve 77 is provided, in the lower end region, with an internal thread 82 which has some play relative to the external thread 38 on the free end region 36 of the spindle 26. It thereby allows the sleeve 77 to execute a tilting movement in a limited angular range relative to the axis 66 of the spindle 26 and an axial and/or radial displacement, so that, once again, an automatic adjustment of the closing part 25 onto the valve seat 14 can take place. In this case, the fixing of the sleeve 77 can be carried out in a simpler way, since the sleeve 77 is screwed directly on the spindle 26, and therefore the point to be soldered between the lower flange 79 and the external thread 38 is more readily accessible.

The above-described three-way valve 1 in the design according to FIG. 5 is assembled in the following order, while specific part steps can, of course, be interchanged if this is necessary for optimum manufacture:

The first valve seat element 15 is screwed or pressed into the central bore 10. The sleeve 77 carrying the closing part 25 together with the support plates 43 and 44 is then screwed onto the free end region 36 of the spindle 26, slight play being left free axially between the closing part 25 and the valve seat 14 of the valve seat element 15. In this position, the sleeve 77 is held at the lower flange 79, for example designed as an outer hexagon, by means of a suitable wrench and the spindle 26 is set to a predetermined prestress (that is to say, with a specific torque or with a specific spring prestress). On account of the slight radial play between the internal thread 82 of the sleeve 77 and the external thread 38, a slight ball-like rotation of the closing part 25 relative to the spindle 26 is possible. As a result, the closing forces exerted on the closing part 25 are distributed uniformly over the circumference of the bearing surface with the valve seat 14, so that closing forces which are uniform over the entire circumference act on the closing part 25 and bring this onto the valve seat 14 into the correct fitted closed position, that is to say into the optimum position in respect of sealing effect and overlap as a result of a tilting movement and axial and/or radial displacement. At the same time, the correct centering of the closing part 25 is achieved via the guide element 39 on the valve seat element 15. In order to fix this state, the lower flange 79 is soldered to the free end region 36 of the spindle 26, as mentioned above. However, a lock nut can also be used for this purpose. The second valve seat element 22 is subsequently screwed or pressed into the inner end region 18 at a predetermined distance from the first valve seat element 15 (see FIG. 1).

If the fitted closed position of the closing part 25 relative to the second valve seat 21 is also to be set, the closing part 25 is brought into the closed position relative to the second valve seat 21 and, in this state, the sleeve 77 is loosened slightly and the spindle 26 tightened again with a specific torque. The second fitted closed position is thereby established in the abovementioned way, and only then is this state secured by soldering.

FIGS. 6 and 7 show a substantially different design of the three-way valve 1, in that the valve seat elements 15 and 22 are mounted rotationally movably in the preassembled state and the closing part 25 is already fastened, in the preassembled state, fixedly in terms of rotation on the spindle 26 (the closing part and spindle are not shown). The valve seat element 15 is held in a bearing surface 84, designed as a ball cup, in the central bore 10 of the partition 6 only partially shown (see FIG. 1 for the correct assignment). Provided above the bearing surface 84, so as to be set back slightly, is an internal thread 85, into which is screwed a fastening ring 86 having a receiving surface 87 designed as a ball cup. The seat element 15 is provided on its radial outside with a bead 88 which is in the form of a spherical sector and which is clamped by the bearing surface 84 and the receiving surface 87. Clamping can be tightened or loosened by rotating the fastening ring 86. For this purpose, radial slots (not shown), into which a tool can be inserted in the manner of a screwdriver, can be provided on the fastening ring 86.

In the same way, the valve seat element 22 is also fastened in the inner end region 18 of the connection piece 5 so as to be rotationally movable in the manner of a ball movement. The similarly designed elements are therefore indicated in this FIG. 7 by the same reference symbols as in FIG. 6, but with a small apostrophe added. To fix the fastening ring 86' a locking ring 89 is also screwed into the internal thread 85'. This version functions in the same way as in the case of the first valve seat element 15.

An elastic intermediate ring (not shown here) can also be arranged between the fastening ring 86 or 86', in order to guarantee a slight elastic twisting of the valve seat element 15 or 22 even in the ready-assembled state. In the present case, absolute parallelism of the planes of the valve seats 14 and 21 can be achieved, presupposing that the valve seats 14 and 21 are perfectly planar. Slight unevenness of the closing part 25 in its edge region can be compensated by means of this version of the valve 1.

However, the valve seat elements 15 and 22 shown in FIGS. 6 and 7 can also be designed with external threads which are screwed with generous thread play into the internal threads 11 and 19 (see FIG. 1) and thus allow a slight rotational movement in relation to the axis of the housing 2.

In a further version (not shown), the valve seat elements 15 and 22 can be provided, in the region of the valve seats 14 and 21, with a form memory alloy (also known as so-called "memory metal").

Details on the form memory alloy can be taken from the article "Anwendung von Formgedächtnis-Legierungen in der Technik" ["Use of form memory alloys in technology"] by Tautzenberger und Stöckel in the Zeitschrift für wirtschaftliche Fertigung und Automatisierung [Journal of Profitable Manufacture and Automation] (Carl Hanser Verlag, Munich) No. 81 (1986) 12, pages 703 to 708. Setting in the fitted closed position is then carried out at increased temperature and, after cooling, the valve seat 14 or 21 remains in the plane set by the fitted closed position.

It is also possible to equip the spindle 26 with a form memory alloy at a predetermined point, in order to achieve adjustability of the closing part 25 on the spindle 26 in the way described.

In a combination of the version of FIGS. 6 and 7 with the versions of FIGS. 2 to 5 (not shown further here), the valve seat elements 15 and 22 can be moved in the preassembled state in the above-described way and the closing part 25 can also be rotated within a restricted range by means of the spindle 26. In such a case, initially the first valve seat element 15 is preset and then the closing part 25 is brought into the fitted closed position relative to the first valve seat 15. The valve seat element 15 and the closing part 25 are fixed in this state. The closing part 25 is then brought into the fitted closed position relative to the second valve seat 21, and the valve seat element 22 is fixed in the abovementioned way.

By means of the designs of a valve which have been described, the closing forces can be reduced to an absolutely necessary minimum, since an inclination of the closing part 25 relative to the valve seat 14 or 21 is avoided and the forces for deforming the closing part 25 in its edge region are therefore no longer necessary for reliable sealing. Consequently, only the sealing forces now have to be applied, and therefore smaller electro-magnets can be used. Furthermore, the tolerances in the overlap of the closing part 25 on the respective valve seat 14 or 21, said tolerances being caused by manufacturing inaccuracies, are exactly compensated by means of the integrated centering device or the guide element 39.

Moreover, it is obvious to the average person skilled in the art that consideration can also be given to other designs of the teaching according to the invention which allow self-setting adjustability between the valve seat element and the closing part in the preassembled state and which, during operation, that is to say in the ready-assembled state, ensure a fitted closed position between these two elements with as little closing force as possible.

We claim:
1. A valve assembly comprising:
   (a) a housing (2) defining a plurality of valve openings, and including first and second coaxially arranged hollow valve seat elements (15, 22) located between said valve openings and defining respective passages therethrough from one valve opening to another valve opening, said first and second valve seat elements including respective axially-spaced annular valve seats (14, 21);
   (b) a spindle (26) disposed within said housing (2) and extending axially through said first and second valve seat elements (15, 22), and being movable axially relative to said first and second valve seat elements (15, 22);
   (c) a valve control part (25) comprising a thin annular disk having a diameter slightly greater than an inside diameter of the annular valve seats (14, 21) of said first and second valve seat elements (15, 22), said control part (25) being carried by said spindle (26) and residing in the space between the valve seats (14, 21) of said first and second valve seat elements (15, 22) for controlling flow through the passages defined by said first and second valve seat elements (15, 22), and, when in a preassembled state, said valve control part (25) being loosely carried on said spindle for angular adjustment relative to said spindle (26) to sealingly align said valve control part (25) with the valve seats (14, 21);
   (d) biasing means (33) engaging a proximal end of said spindle (26) for normally urging said spindle (26) and said valve control part (25) into a closed position, wherein said valve control part (25) sealingly engages the valve seat (14) of the first valve seat element (15), thereby closing the passage through said first valve seat element (15) and opening the passage through said second valve seat element (22);
   (e) first and second annular flat support plates (67, 68) residing on opposite sides of said control part (25) for supporting said control part (25) in the closed position against the annular valve seat (14, 21) of the first or second valve seat element (15, 22);
   (f) first and second opposing hemispheres (69, 70) formed around said spindle (26) adjacent respective first and second support plates (67, 68), each of said hemispheres (69, 70) defining a central bore through which said spindle (26) extends; and
   (g) means (40) for fixing said control part (25) in an assembled state relative to said spindle (26), such that said control part (25) remains in sealing alignment with the valve seat (14) of said first valve seat element (15) upon opening and closing of the passage through said first or second valve seat element (15, 22).

2. A valve assembly according to claim 1, wherein the diameter of said first and second annular support plates is less than the diameter of said valve control part.

3. A valve assembly according to claim 1, wherein the central bore of each of said first and second hemispheres is generally conical tapering in diameter from an outside to an inside of the hemisphere, such that said first and second hemispheres are tiltable relative to said spindle for allowing angular adjustment of the valve control part on the annular valve seat of the first valve seat element with said second valve seat element in the preassembled state.

4. A valve assembly according to claim 1, and comprising first and second intermediate tubes surrounding said spindle and engaging an outside of respective first and second hemispheres.

5. A valve assembly according to claim 4, wherein an engaging end of each of said first and second tubes defines a spherical recess adapted for receiving respective first and second hemispheres.

6. A valve assembly according to claim 1, wherein said biasing means comprises a helical spring.

7. A valve assembly according to claim 1, wherein said fixing means comprises an internally-threaded cap adapted for being mated with a complementary external screw thread formed on the free end of said spindle.

8. A valve assembly comprising:
   (a) a housing (2) defining a plurality of valve openings, and including first and second coaxially arranged hollow valve seat elements (15, 22) located between said valve openings and defining respective passages therethrough from one valve opening to another valve opening, said first and second valve seat elements including respective axially-spaced annular valve seats (14, 21);

(b) a spindle (26) disposed within said housing (2) and extending axially through said first and second valve seat elements (15, 22), and being movable axially relative to said first and second valve seat elements (15, 22);

(c) a valve control part (25) comprising a thin annular disk having a diameter slightly greater than an inside diameter of the annular valve seats (14, 21) of said first and second valve seat elements (15, 22), said control part (25) being carried by said spindle (26) and residing in the space between the valve seats (14, 21) of said first and second valve seat elements (15, 22) for controlling flow through the passages defined by said first and second valve seat elements (15, 22), and, when in a preassembled state, said valve control part (25) being loosely carried on said spindle for angular adjustment relative to said spindle (26) to sealingly align said valve control part (25) with the valve seats (14, 21);

(d) biasing means (33) engaging a proximal end of said spindle (26) for normally urging said spindle (26) and said valve control part (25) into a closed position, wherein said valve control part (25) sealingly engages the valve seat (14) of the first valve seat element (15), thereby closing the passage through said first valve seat element (15) and opening the passage through said second valve seat element (22);

(e) first and second annular flat support plates (67, 68) residing on opposite sides of said control part (25) for supporting said control part (25) in the closed position against the annular valve seat (14, 21) of the first or second valve seat element (15, 22);

(f) first and second opposing hemispheres (69, 70) adjacent respective first and second support plates (67, 68), such that said valve control part (25) is tiltable relative to said spindle (26) for allowing angular adjustment of the valve control part (25) on the annular valve seat (14) of the first valve seat element (15) in the preassembled state; and (g) means (40) for fixing said control part (25) in an assembled state relative to said spindle (26), such that said control part (25) remains in sealing alignment with the valve seat (14) of said first valve seat element (15) upon opening and closing of the passage through said first or second valve seat element (15, 22).

* * * * *